J. B. DE WOLF.
TRACTOR ATTACHMENT FOR BINDERS.
APPLICATION FILED JUNE 5, 1917.
1,258,660.
Patented Mar. 12, 1918.
2 SHEETS—SHEET 2.
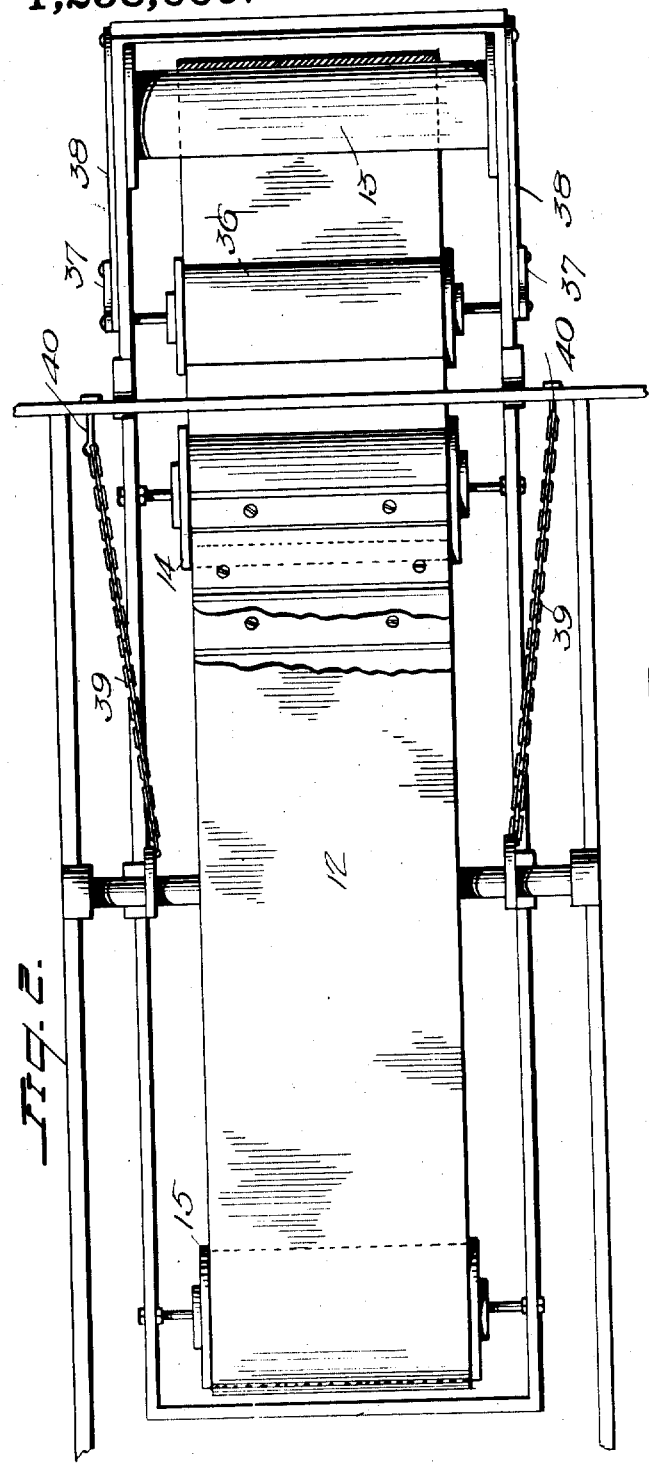
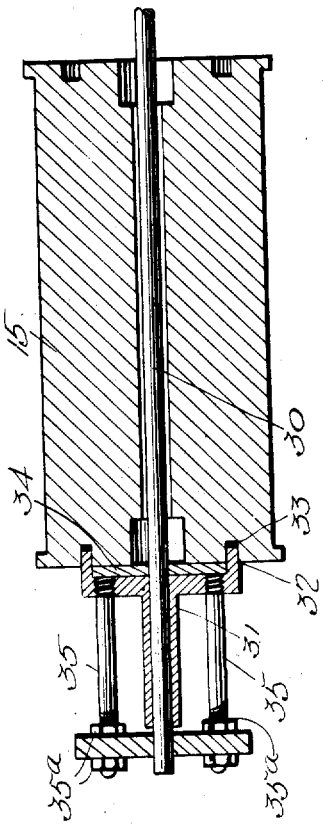
WITNESSES
INVENTOR
John B. De Wolf
BY
ATTORNEYS

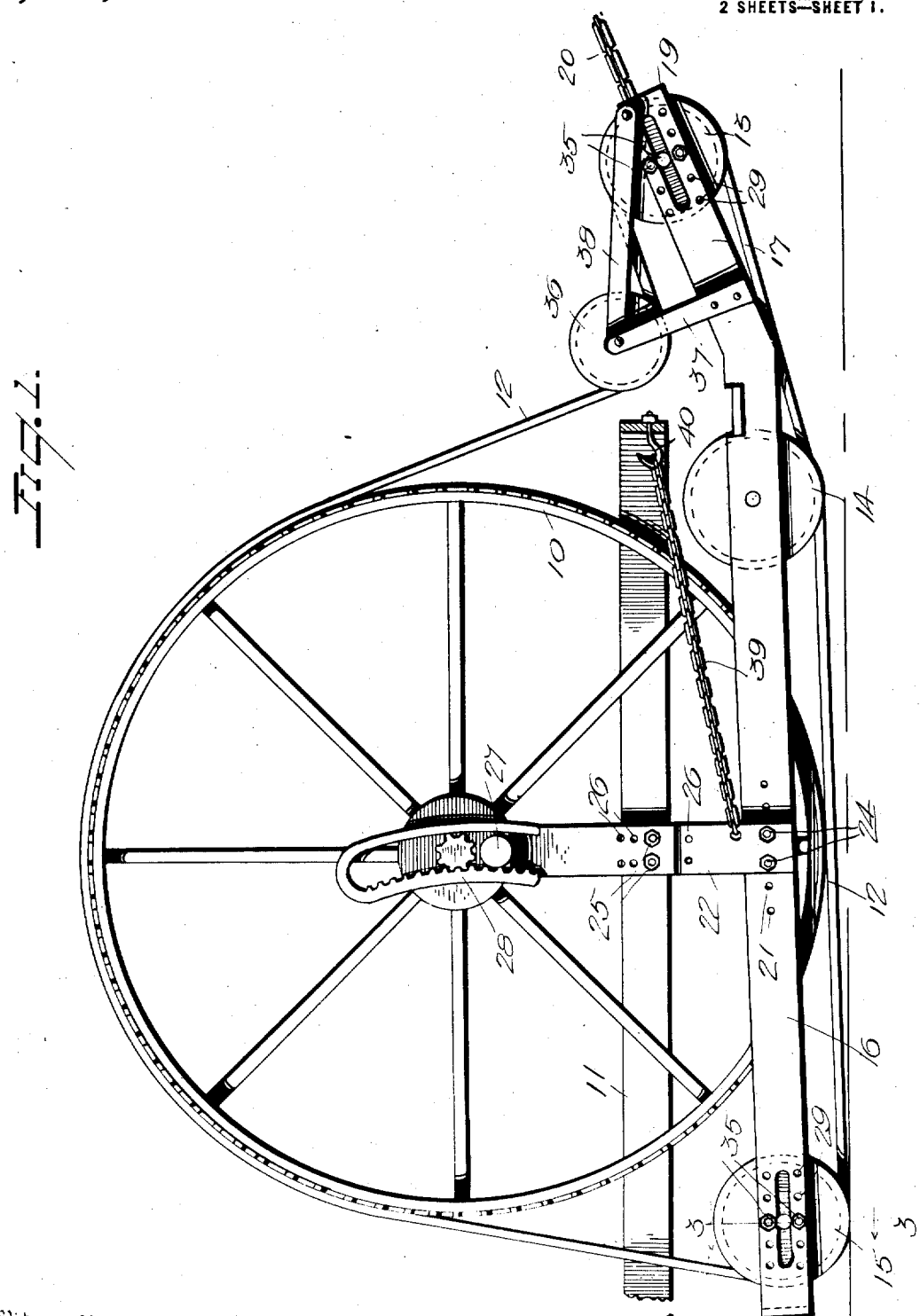

UNITED STATES PATENT OFFICE.

JOHN BROUGH DE WOLF, OF HURON, SOUTH DAKOTA.

TRACTOR ATTACHMENT FOR BINDERS.

1,258,660.   Specification of Letters Patent.   Patented Mar. 12, 1918.

Application filed June 5, 1917. Serial No. 172,904.

*To all whom it may concern:*

Be it known that I, JOHN BROUGH DE WOLF, a citizen of the United States, and a resident of Huron, in the county of Beadle, and State of South Dakota, have invented a certain new and useful Improvement in Tractor Attachments for Binders, of which the following is a specification.

My present invention relates generally to tractor attachments for binders and various other agricultural implements, particularly those having power driven tractor wheels, my object being the provision of an attachment of a simple and inexpensive nature, attachable to machines of these and other types, in order to increase the area of tractive contact with the surface over which the machine is operated.

My invention also aims to provide a device of this nature capable of preventing slippage or dragging of the tractive wheels when the machine is being used upon soft wet traction surfaces, as well as one capable of adjustment to tractor wheels of varying sizes and requiring minimum labor in its application to and removal from a machine.

With these objects in mind, my invention resides particularly in the details of construction, arrangement, and operation to be presently described with reference to the accompanying drawings forming a part of this specification, and wherein—

Figure 1 is a side elevation illustrating my improved attachment in connection with a portion of the frame of a machine and its tractor wheel to which my invention is applied;

Fig. 2 is a top plan view of a part shown in Fig. 1, and

Fig. 3 is a detail vertical section through a part of one of the guide rollers of the traction belt taken substantially on line 3—3 of Fig. 1.

Referring now to these figures, my invention is capable of application to binders and various other agricultural machines, and is particularly adapted to those employing power driven tractor wheels, of which a wheel appears at 10 in Fig. 1, in connection with a portion 11 of the frame of the machine of any suitable character, by an examination of which my improvements and the manner in which they are attached, may be plainly discerned from the following.

My invention contemplates the utilization and support in connection with a tractor wheel 10 of an endless traction belt 12 passing around the upper portion of the periphery, that is, above its horizontal median line, and below the lower portion of the wheel in a substantially horizontal plane between points forwardly and rearwardly of the vertical plane of the axis of the wheel, so as to increase the area of contact with the traction surface upon which the machine proceeds. In order that this arrangement may be carried out, the traction belt 12 passes around guide rollers 13, 14, and 15, the latter mounted at the forward, intermediate, and rear portions respectively of the frame 16 of my improved attachment, which frame is generally rectangular in form, as seen by a comparison of Figs. 1 and 2, with the forward portions of its side bars inclined upwardly to obviate interference with any portion of the machine in connection with which the attachment may be used, the upper forward inclined portion 17 of the frame having a forward cross bar 19. From the cross bar 19 a chain 20 may extend to a suitable portion of the machine in connection with which it is utilized, in order to hold the frame 16 of the attachment in proper relation to the adjacent parts in turning or angular movements of the machine.

The side bars of the frame 16, which frame surrounds the lower portion of the tractor wheel and is below the frame 11 of the machine, are provided at intermediate points with series of openings 21 providing for the adjustable connection of the lower ends of uprights 22, the connection being made by bolts 24 and the like. These uprights 22 are in two parts, as seen clearly in Fig. 1, having series of openings adjacent their connected ends, whereby to provide for adjustable connection by means of bolts 25, the series of openings appearing at 26. The upper ends of the uprights have rollers 27 engaging the usual adjusting fork 28 in order to avoid friction.

The belt 12 may be formed of suitable material and is preferably of approximately the width of the tractor wheel 10 to interfit the grooved faces of the several guide rollers 13, 14, and 15, each of which rotates upon a shaft 30, as seen in Fig. 3, and is spaced at its ends from the sides of the frame 16 by sleeves 31 through which the shaft 30 also extends, each sleeve having an inner annular surrounding flange 32 to interfit the annular groove 33 of the adjacent roller end, so as to exclude dust and dirt from the axle bearing of the roller, the end thrust of the roller being taken up against a flexible pad 34 within the inner flanged end of the sleeve 31 which the roller end abuts, all as seen in Fig. 3.

The intermediate roller 14 is fixedly journaled intermediate the ends of the frame 16, while the latter is longitudinally slotted in its side bars adjacent its forward and rear ends respectively, to receive the ends of the shafts 30 of the rollers 13 and 15, so as to thus permit adjustment of the latter, the frame side bars having openings 29 along their slots to receive the outer ends of bolts 35 extending from the sleeves 31, on which are threaded nuts 35ª to hold the rollers in adjusted positions.

The belt may extend upwardly around the upper portion of the periphery of the wheel 10 directly from the forward guide roller 13, or, in case the construction of the machine in connection with which the attachment is used requires it, the belt may extend from the forward roller 13 upwardly around the wheel and beneath a supplemental guide roller 36 journaled at the upper ends of the upwardly projecting brackets 37 secured at the lower ends of the sides of the frame 16 adjacent its forward end and braced by the forwardly extending inclined braces 38, the forward ends of which may be secured to the sides of the frame 16 adjacent the forward cross bar 19.

The frame 16 as thus constructed, with its several guide rollers and endless traction belt, is also preferably steadied and held in the position described by means of side chains 39 secured to the lower ends of the uprights 22, and extending forwardly, as seen by reference to Figs. 1 and 2, having connection with hooks 40 secured to the forward portion of the frame 11 of the machine in connection with which the attachment is used, or these chains may be otherwise anchored to the frame of the machine.

As thus described it is obvious that my invention is capable of ready and easy attachment in connection with machines for which its functions are desirable; that it provides simple and comparatively inexpensive means for effectively increasing the area of tractive engagement with the surface upon which the machine is operated, to prevent slippage and to generally better the action of the machine in its movement.

I claim:

1. The combination with a machine including a frame, a wheel shaft, and a traction wheel mounted on said shaft, of an attachment therefor consisting of a generally rectangular frame inclosing the lower portion of the wheel below the main frame, and disposed in a generally horizontal position, guide rollers journaled in the said attachment frame forwardly and rearwardly of the traction wheel with their axes substantially parallel to the axis of the traction wheel, and an endless traction belt extending around the traction wheel and the said guide rollers and upon which the traction wheel moves in operation, said attachment frame having adjustable uprights, the upper ends of which are provided with rollers engaging portions of the machine.

2. The combination with a machine including a frame, a wheel shaft, and a traction wheel mounted on said shaft, of an attachment therefor consisting of a generally rectangular frame inclosing the lower portion of the wheel below the main frame and disposed in a generally horizontal position, guide rollers journaled in the said attachment frame forwardly and rearwardly of the traction wheel with their axes substantially parallel to the axis of the traction wheel, and an endless traction belt extending around the traction wheel and the said guide rollers and upon which the traction wheel moves in operation, said attachment frame having uprights adjustably connected thereto, and each of which uprights includes adjustable sections, the upper section of which is provided with a roller at its upper end engaging a portion of the machine.

3. The combination with a machine including a main frame, a wheel shaft, and a traction wheel mounted on the shaft, of an endless traction belt extending around the traction wheel, a frame having guide rollers for guiding and tensioning the traction belt, including rollers forwardly and rearwardly of the lower portion of the wheel, and means for attaching said frame in position, including flexible members attachable to the main frame of the machine and uprights having anti-friction means engaging portions of the main frame.

JOHN BROUGH DE WOLF.

Witnesses:
V. C. BONESTEEL,
L. E. CHRISTENSEN.